United States Patent
Na et al.

(10) Patent No.: US 7,391,736 B2
(45) Date of Patent: Jun. 24, 2008

(54) METHOD AND APPARATUS FOR TRANSMITTING PACKET DATA HAVING COMPRESSED HEADER

(75) Inventors: Seung-Gu Na, Yongin-shi (KR); Yong-Keon Kim, Yongin-shi (KR); Woo-Sung Jun, Songnam-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 869 days.

(21) Appl. No.: 10/617,259

(22) Filed: Jul. 11, 2003

(65) Prior Publication Data
US 2004/0071096 A1    Apr. 15, 2004

(30) Foreign Application Priority Data
Aug. 28, 2002    (KR) .................. 10-2002-0051167

(51) Int. Cl.
*H04L 12/56* (2006.01)
(52) U.S. Cl. .................. 370/252; 370/338; 370/328; 370/389; 370/477; 370/471; 370/392
(58) Field of Classification Search .............. 370/252, 370/384, 392, 349, 395.2, 474; 455/517; 709/247
See application file for complete search history.

(56) References Cited

U.S. PATENT DOCUMENTS

| 5,761,438 | A  * | 6/1998 | Sasaki ................... 709/247 |
| 6,577,596 | B1 * | 6/2003 | Olsson et al. ............ 370/230 |
| 6,845,105 | B1 * | 1/2005 | Olsson et al. ............ 370/469 |
| 6,886,040 | B1 * | 4/2005 | Fitzgerald .............. 709/224 |
| 6,914,903 | B1 * | 7/2005 | Miyazaki et al. ......... 370/389 |
| 2001/0048680 | A1 * | 12/2001 | Yoshimura et al. ....... 370/389 |
| 2002/0152299 | A1 * | 10/2002 | Traversat et al. ........ 709/223 |
| 2003/0086373 | A1 * | 5/2003 | Kronz .................. 370/235 |

OTHER PUBLICATIONS

Schulzrinne et al., RTP: A Transport Protocol for Real-Time Applications, Jan. 1996, Network Working Group, Request for Comments: 1889, pp. 15-20.*
Degermark et al., IP Header Compression, Feb. 1999, Network Working Group, Request for Comments: 2507, pp. 11 and 42.*
Jacobson, Compressing TCP/IP Headers for Low-Speed Serial Links, Feb. 1990, Netwok Working Group, Request for Coments: 1144.*

* cited by examiner

*Primary Examiner*—Duc M. Nguyen
*Assistant Examiner*—German Viana Di Prisco
(74) *Attorney, Agent, or Firm*—Roylance, Abrams, Berdo & Goodman, L.L.P.

(57) ABSTRACT

A method is disclosed for transmitting and receiving packetized data having multiple protocol headers in a packet data communication system. An operating state of a network is determined, and a period for transmitting a full packet is decided according to a result of the determination. Full packets having uncompressed headers are transmitted during periodic transmission times according to the decided full-packet transmission period, and compressed packets are transmitted in other transmission times. If the operating state of the network is decided to be a congested state according to an average packet retransmission ratio produced in a period for measuring the operating state of the network, the full-packet transmission period is set to "1". A value of the full-packet transmission period in an unloaded state is twice a value of the full-packet transmission period in a normal state. Thus, the number of packets to be discarded due to packet loss can be reduced, and the efficiency of transmission can be improved by header compression technologies.

22 Claims, 9 Drawing Sheets

FIG.1

Prior Art

Prior Art

```
        #define ALPHA 0.75
        #define TH_HIGH 0.10
        #define TH_LOW 0.05

// PRODUCE PACKET RETRANSMISSION RATIO (NUMBER OF RETRANSMITTED
           PACKETS/NUMBER OF TRANSMITTED PACKETS) EVERY 5 SECONDS.
(S120)  R = RetransPkts / SentPkts ;

// PRODUCE AVERAGE PACKET RETRANSMISSION RATIO USING
           LOW-PASS-FILTER FORMULA.
(S130)  AR = (1-ALPHA)*AR
             +ALPHA * R;

// CLASSIFY THREE OPERATING STATES ACCORDING TO PACKET
           RETRANSMISSION RATIO, AND DECIDE WHEN FULL PACKET MUST BE
           TRANSMITTED ACCORDING TO EACH OPERATING STATE
        if (AR >= TH_HIGH) {
(S150)     State = Congested;
           Period = 1;
        } else if (AvgRetransRate <= TH_LOW) {
(S170)     State = unloaded;
           Period = 2n;
        } else
(S160)     State = Loaded;
           Period = n;
        }

// TRANSMIT FULL PACKET IN PERIOD.
(S180)  for (i=1; i<=Period; i++) {
           if (i == Period)
              send full packets;
           else
              send compressed packets;
        }
```

FIG.9

METHOD AND APPARATUS FOR TRANSMITTING PACKET DATA HAVING COMPRESSED HEADER

PRIORITY

This application claims priority to an application entitled "METHOD AND APPARATUS FOR TRANSMITTING PACKET DATA HAVING COMPRESSED HEADER", filed in the Korean Industrial Property Office on Aug. 28, 2002 and assigned Serial No. 2002-51167, the contents of which are hereby incorporated by reference.

BACKGROUND OF THE INVENTION

1. Field of the Invention

The present invention relates to a packet data communication system, and more particularly to a method for transmitting and receiving packetized data having a multi-protocol header.

2. Description of the Related Art

As a protocol for transmitting data through the Internet, transmission control protocol (TCP) is described in Request For Comments (RFC) 793 issued by the Internet Engineering Task Force (IETF). TCP is used for transmitting data in packet format between nodes of the Internet. In the network layer hierarchy, TCP functions as the protocol of the transport layer. Below the transport layer is the network layer, which uses internet protocol (IP).TCP and IP are collectively referred to as TCP/IP.

In typical data transmission technologies based on TCP/IP, packetized data contains at least one header used for controlling a network protocol function. Because the header consumes part of the available bandwidth for a communication channel, research on various technologies for compressing the header to optimally use the bandwidth is ongoing.

The need for TCP/IP header compression is increased in a wireless communication system designed to transmit voice and/or data using a radio frequency (RF), which is typically noisier and has greater bandwidth limitations than wired communication systems.

Van Jacobson has proposed a method for compressing a TCP/IP header. The proposed method removes redundant static information from a TCP/IP packet and contains, in the packet, difference values required to determine changing information. One of two nodes (hereinafter, referred to as a transmitting node) periodically transmits packets containing uncompressed headers (hereinafter, referred to as full packets) to another node (hereinafter, referred to as a receiving node). The transmitting node removes the static information from the full packets, and leaves only the difference values of the changing information in headers of the packets so that the transmitting node can transmit, to the receiving node, packets having compressed headers (hereinafter, referred to as compressed packets). Upon receiving the compressed packets, the receiving node refers to information in the headers and decompresses the headers of the compressed packets.

However, if one of a series of packets is damaged or lost because an operating state of the communication channel is bad and the network is in a congested state, the receiving node will be unable to decompress the headers of the compressed packets transmitted by the transmitting node. Further, the receiving node will not send an acknowledgement associated with the damaged or lost compressed packet, and the receiving node will request the transmitting node to retransmit a corresponding compressed packet after receiving a full packet corresponding to the damaged or lost compressed packet. As a result, the receiving node is required to store all of the compressed packets received after a packet loss until a full packet corresponding to the lost packet is received.

Thus, simple technologies for compressing and transmitting a header of a TCP/IP packet can address some problems associated with repeatedly transmitting static information, but can cause the above-described serious problems in radio frequency (RF) environments. In particular, errors may frequently occur in RF environments. If a packet transmission error occurs, a data reception operation must be stopped until a damaged or lost packet is retransmitted. As a result, simple compression schemes can cause the efficiency of transmission to be severely degraded in noisy environments.

SUMMARY OF THE INVENTION

The above identified problems are avoided and other advantages are realized in embodiments of the present invention. It is one object of embodiments of the present invention to provide a method and apparatus for improving the efficiency of transmission in a system for transmitting packet data having a compressed header.

It is another object of embodiments of the present invention to provide a method and apparatus for improving the efficiency of transmission in a packet data transmission system based on transmission control protocol/Internet protocol (TCP/IP) and a wireless communication system.

It is another object of embodiments of the present invention to provide a method and apparatus for preventing degradation of the efficiency of transmission due to packet damage in a system for transmitting packet data having a compressed header.

It is yet another object of embodiments of the present invention to provide a method and apparatus for transmitting a packet having an uncompressed header in a system for transmitting packet data having a compressed header.

In accordance with one aspect of embodiments of the present invention, the above and other objects can be accomplished using a method for transmitting packet data in a packet communication network, comprising the steps of: determining an operating state of the network and deciding a period for transmitting a full packet according to the determined operating state; and transmitting full packets having uncompressed headers during periodic transmission times according to the decided full-packet transmission period, and transmitting compressed packets during other transmission times.

In accordance with another aspect of embodiments of the present invention, there is provided an apparatus for transmitting packet data in a packet communication network, comprising: a controller for determining an operating state of the network and deciding a period for transmitting a full packet according to the determined operating state; and a transmitter for transmitting full packets having uncompressed headers during periodic transmission times according to the decided full-packet transmission period, and transmitting compressed packets during other transmission times.

BRIEF DESCRIPTION OF THE DRAWINGS

The above and other objects, features and other advantages of the present invention will be more clearly understood from the following detailed description of embodiments thereof taken in conjunction with the accompanying drawings, in which.

DETAILED DESCRIPTION OF THE PREFERRED EMBODIMENTS

Preferred embodiments of the present invention will now be described in detail with reference to the attached drawing figures. In the following description, a detailed description of known functions and configurations incorporated herein will be omitted in order to make the subject matter of the present invention more clear. The words or expressions to be described below are defined on the basis of functions associated with the present invention. The defined words or expressions can be changed according to intentions or usual practices of a user or operator. Thus, the terminology can be based on the entire contents of the present invention.

In accordance with embodiments of the present invention, a packet data transmission system using at least one compressed header can set a period for transmitting packet data having at least one uncompressed header, on the basis of the operating state of a network. In particular, the present invention determines the operating state of the network according to a packet retransmission ratio.

As more and more users need high-speed wireless packet data communications, various methods are attempted to interface a mobile communication network with a packet network such as the Internet, etc. In one of the various methods, a code division multiple access (CDMA) 2000-based 1× Evolution in Data Only (1×EVDO) system connects a radio access network to the Internet using a gateway which is called a packet data serving node (PDSN). The PDSN relays IP packet data items between a computer accessing the Internet and a mobile terminal.

Figure 1:
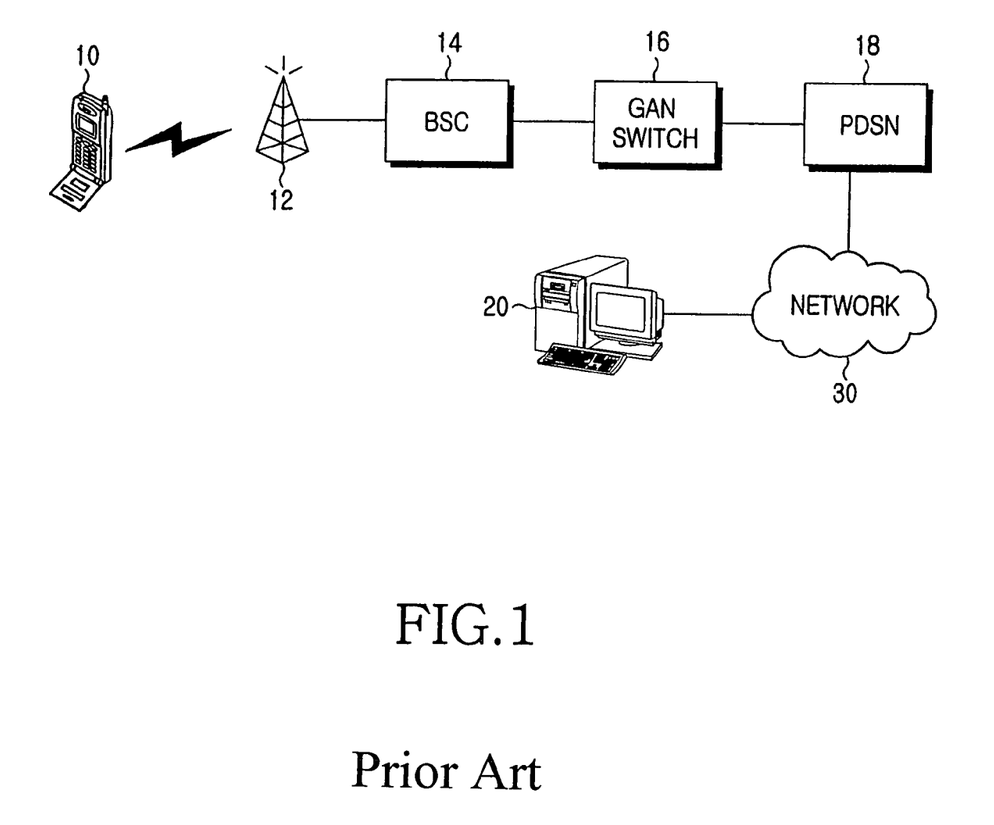
FIG. 1 is a block diagram illustrating the configuration of a typical wireless packet data transmission system in which embodiments of the present invention can be employed.

FIG. 1 is a block diagram illustrating the configuration of a typical wireless packet data transmission system in which embodiments of the present invention can be employed.

Referring to FIG. 1, the packet data transmission system includes a base transceiver subsystem (BTS) 12 for delivering services to a mobile terminal 10 through a radio channel; a base station controller (BSC) 14 for controlling the BTS 12; and a global asynchronous transfer mode (ATM) network (GAN) switch 16 for connecting the BSC 14 to a packet communication network 30 such as the Internet through a packet data serving node (PDSN) 18. Through the above-described configuration, the mobile terminal 10 exchanges packet data with a computer 20 accessing the packet communication network 30.

Here, the mobile terminal 10 can be a notebook computer connected to a cellular phone or personal communications service (PCS) phone, a personal digital assistant (PDA) phone capable of performing Internet communication, an international mobile telecommunication-2000 (IMT-2000) terminal, among other things. The computer 20 can be a web server, a file transfer protocol (FTP) server, or any other internet connected computer capable of exchanging packetized data. In a typical configuration, computer 20 is configured as an FTP server, and provides, a file requested by a user to the mobile terminal 10 in the form of packet data. In this case, the FTP server 20 is a transmitting node, and the mobile terminal 10 is a receiving node.

FIG. 1 shows the transmitting node as the FTP server 20, the receiving node as the mobile terminal 10, and a plurality of devices connected between the mobile terminal 10 and the FTP server 20. However, embodiments of the present invention are not limited to the configuration shown in FIG. 1. That is, embodiments of the present invention are applicable to any other data transmission system associated with the technical background of the present invention. Those skilled in the art will appreciate that various modifications, additions and substitutions are possible, without departing from the scope of the invention.

Figure 2:
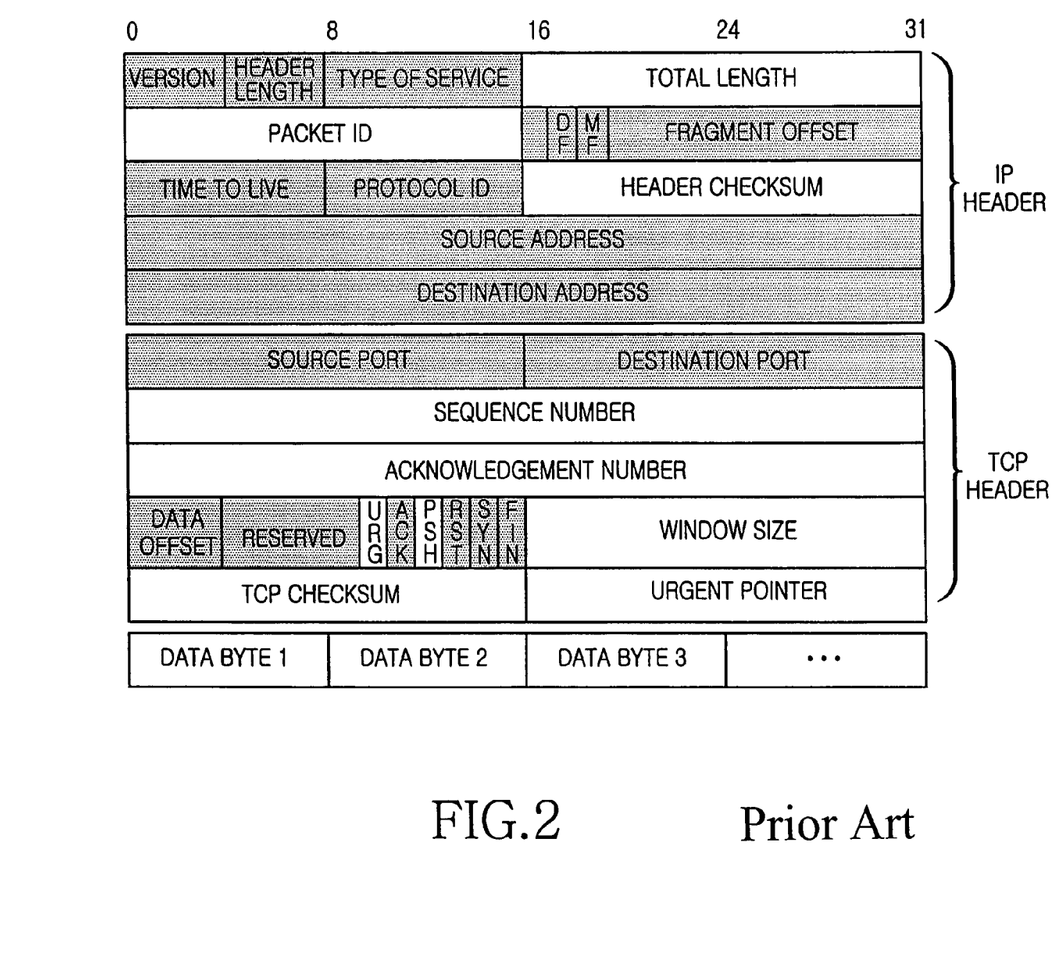
FIG. 2 is a view illustrating a format of a packet based on transmission control protocol/Internet protocol (TCP/IP)

The transmitting node divides a file to be transmitted into a plurality of packets and sequentially transmits the packets to the receiving node. TCP/IP header includes an IP header and a TCP header, as shown in FIG. 2. The format of a data packet in a communication system using transmission control protocol (TCP) based on Internet protocol (IP) (hereinafter, referred to as TCP/IP), is illustrated in FIG. 2.

The IP header typically includes redundant static information items indicated by shaded fields. A 4-bit protocol "version" field indicates a format of an IP header. A format of a version 4 header disclosed in Request For Comments (RFC) 791 will be described. A 4-bit "header length" field indicates an IP header length, and also indicates where data begins. A "type-of-service" field contains 8-bit information indicating desired quality of service (QoS) in terms of delay, reliability and throughput. A 16-bit "total length" field indicates the length of the packet (including a header and data) measured in octets. A "packet identifier" is a 16-bit identification value assigned by the transmitting node to aid in assembling datagram fragments. The first reserved bit among three 1-bit flags is set to "0", the second bit is a "Don't Fragment" (DF) flag indicating a fragment or not, and the third bit is a "More Fragment" (MF) flag indicating the last fragment or not. A 13-bit "fragment offset" field indicates a position of a corresponding fragment in a datagram. A "time-to-live" (TTL) field has 8 bits indicating a maximum lifetime of a corresponding datagram. An 8-bit "protocol identifier" indicates a protocol used for a data part of the datagram. Here, the 8-bit protocol identifier indicates the TCP. A 16-bit "header checksum" field indicates error correction information for the header. Source and destination address fields indicate 32-bit IP addresses of a source and destination, respectively. In this example, the only changing information items correspond to the total length field, packet identifier field and header checksum field.

In the TCP header, source and destination port fields indicate 16-bit port numbers of the source and destination, respectively. A 32-bit "sequence number" is a sequence number of the first data octet. A 32-bit "acknowledgement number" is the next sequence number that the transmitting node is expecting to receive. A 4-bit "data offset" field indicates how many 32-bit words the TCP header has. A 6-bit "reserved field" is set to "0". Six control bits indicate "urgent pointer" (URG), "acknowledgement" (ACK), "push" (PSH), "reset" (RST), "synchronization" (SYN) and "final" (FIN) used for determining types of acknowledgements if the above-described six control bits correspond to standardized TCP acknowledgements. Meanings of the control bits are as follows:

URG: Urgent Pointer field significant
 ACK: Acknowledgement field significant
 PSH: Push function
 RST: Reset the connection
 SYN: Synchronize sequence numbers
 FIN: No more data from the transmitting node A 16-bit "window size" indicates the maximum number of sequence numbers that the transmitting node is willing to accept. A 16-bit "TCP checksum" field indicates a checksum for the header and data. A 16-bit "urgent pointer" points to a sequence number of octet following urgent data. In the TCP header, the changing information items are remaining fields other than the source and destination port fields, data offset field and some of the control bit fields, and the static information items are indicated by the shaded fields in FIG. 2.

The IP header consists of 20 bytes, and also the TCP header consists of 20 bytes. After the TCP connection is established, approximately 20 bytes indicated by the shaded fields among the overhead of a total of 40 bytes are not changed. It is inefficient that the total of the 40-byte overhead is transmitted each time a packet is transmitted. Thus, it is preferable that the static information is removed from full packets having uncompressed headers, and compressed packets having compressed headers in which only difference values associated with the changing information are included and transmitted.

Where the header compression technologies are used, the header of a full packet can further include a context identifier (CID) needed for identifying the context that should be used to decompress the compressed header. The context indicates a state where the transmitting node compresses the header and the receiving node decompresses the compressed header.

Figure 3:
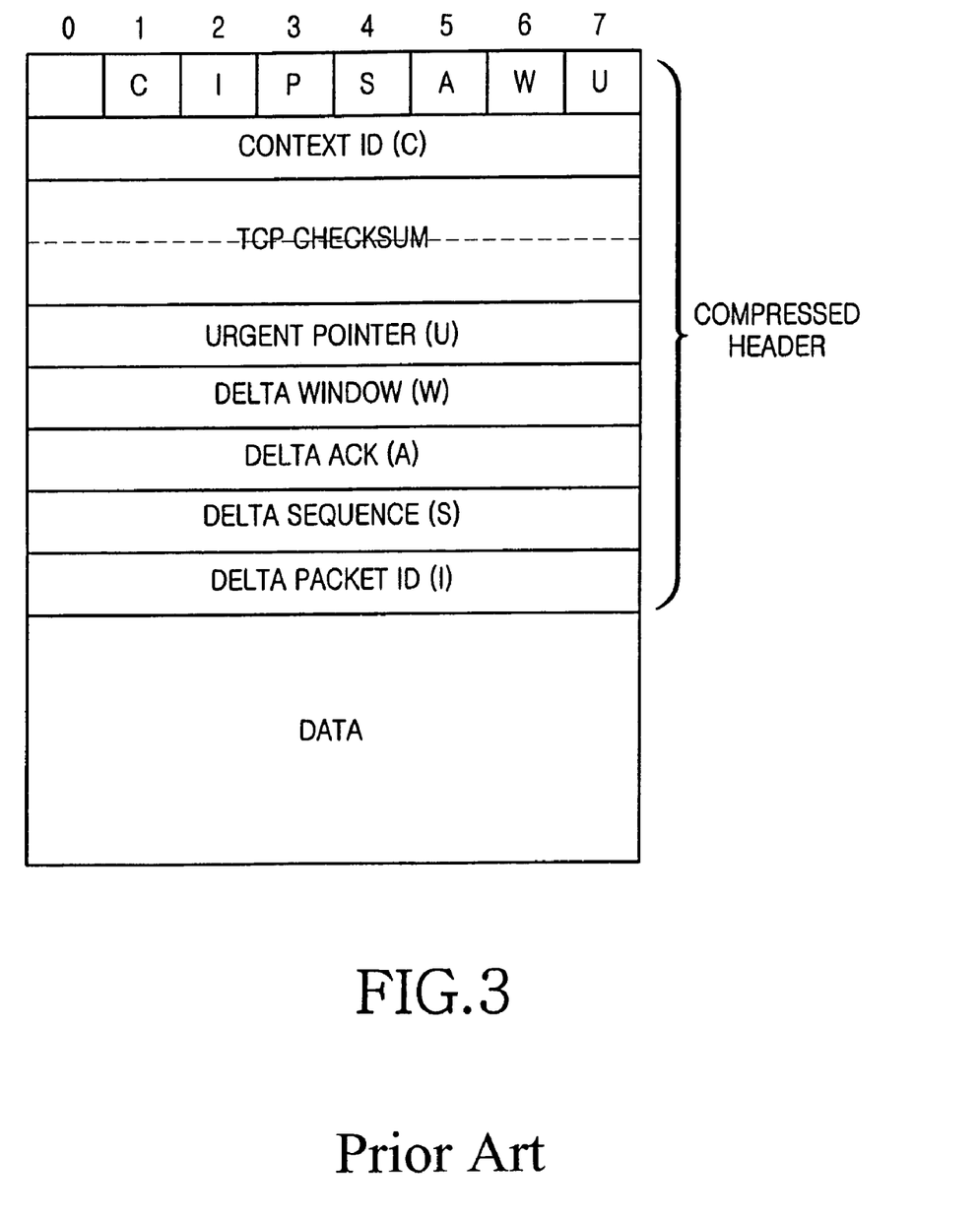
FIG. 3 is a view illustrating an exemplary format of a packet having a compressed TCP/IP header.

FIG. 3 shows the format of a packet having a compressed TCP/IP header disclosed in RFC 2507 issued by the IETF. As shown in FIG. 3, a compressed packet does not include the static information indicated by the shaded fields in FIG. 2. The receiving node decompresses the compressed header on the basis of the context of the TCP/IP header specified by the CID contained in the compressed packet. TCP checksum information is transmitted for checking end-to-end data integrity.

It is expected that difference values between sequentially and continuously transmitted packets containing window sizes, acknowledgement numbers, sequence numbers and packet identifiers in the TCP/IP headers are constant. Fields indicating the difference values are referred to as delta fields. Where difference values between the delta fields are constant, the compressed header does not basically include the difference values within the delta fields. The receiving node having stored a full header extracted from a previously received packet adds values recorded in the delta fields of the TCP/IP header to previously produced difference values and then recovers delta fields of a subsequently received compressed packet.

The difference values of the delta fields between all packets are not always constant. Where the difference values are not constant, the transmitting node must notify the receiving node of changed difference values. The receiving node refers to the context of the stored full header and the notified difference values, and then recovers data items corresponding to the delta fields of the compressed packet. The compressed packet shown in FIG. 3 has change mask information, i.e., S, A, W and I flags, indicating whether difference values of the delta fields have been changed.

The S, A, W and I flags indicate whether a sequence number, acknowledgement number, window size and packet identifier contained in the TCP/IP header have been changed. Where the difference values of the delta fields are changed, a compressed packet includes corresponding delta fields indicating difference values of fields between itself and a previous packet. Where a difference value between sequence numbers is changed, the S flag is set to "1". In that case, a delta sequence field indicating a difference value associated with the sequence number is attached to the compressed packet. Similarly, where a difference value between window sizes, acknowledgement numbers or packet identifiers is changed, the W, A or I flag is set to "1". In this case, a corresponding field indicating the difference value between the window sizes, acknowledgement numbers or packet identifiers is attached to the compressed packet. Upon receiving the compressed packet, the receiving node adds the difference values contained in the compressed packet to corresponding fields of a previously received packet, such that the receiving node can recover complete field values of the compressed packet.

Further, the U and P flags shown in FIG. 3 indicate the copies of URG and PSH control bits among the control bits of the TCP/IP header, respectively. A C flag can be optionally removed since the CID is always contained in the compressed packet.

The size of the compressed header is 9 bytes or less, and can be reduced to half of the size of the uncompressed header or more.

Figure 4:
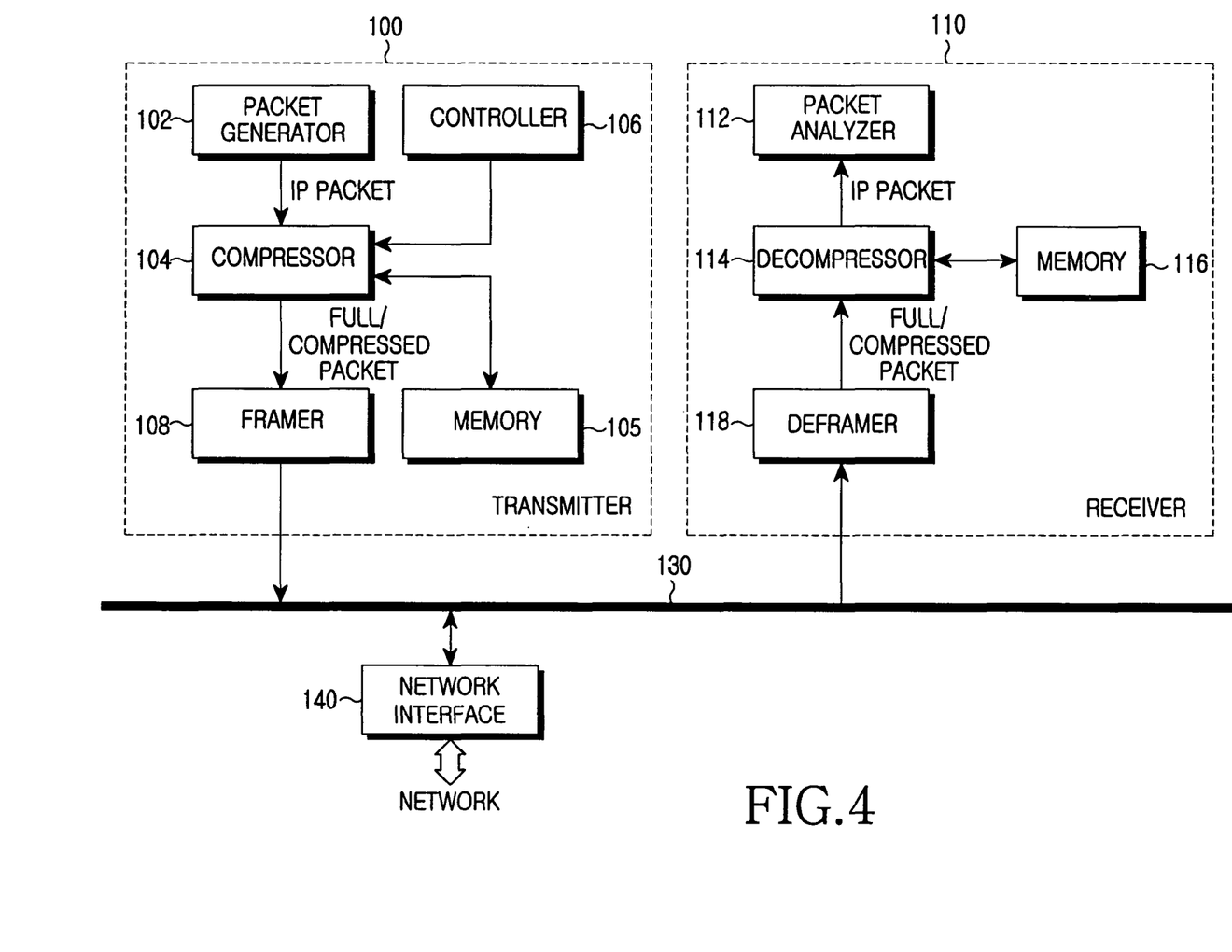
FIG. 4 is a block diagram illustrating the configurations of communication nodes using header compression technologies in accordance with an embodiment of the present invention.

FIG. 4 is a block diagram illustrating the configurations of communication nodes using header compression technologies in accordance with an embodiment of the present invention. The configurations shown in FIG. 1 are applied to the mobile terminal 10 and FTP server 20.

Referring to FIG. 4, the communication nodes include a transmitter 100, receiver 110, a network interface 140, and a bus 130 connected between the transmitter 100, receiver 110 and network interface 140. The receiver 110 receives a full packet or compressed packet transmitted from the transmitting node through a communication channel and analyzes the packet. The transmitter 100 converts data to be transmitted into a full packet or compressed packet to transmit the full packet or compressed packet to the receiving node through the communication channel.

In detail, a packet generator 102 of the transmitter 100 generates an IP packet having TCP and IP headers attached to data to be transmitted. A compressor 104 of the transmitter 100 converts the IP packet into the full packet having an uncompressed header or the compressed packet having a compressed header. The compressed header includes a delta field associated with at least one of the fields contained in the uncompressed header of the full packet. Header information of the IP packet is stored in a memory 105 such that the header information can be used for generating the next compressed packet to be transmitted.

A framer 108 transfers the full packet or compressed packet to the network interface 140 through the bus 130. The network interface 140 transmits the full packet or compressed packet to a corresponding receiving node through the communication channel. Here, the compressor 104 outputs the full packet in a predetermined period. In another period, the compressor 104 outputs the compressed packet. The period for transmitting the full packet from the compressor 104 depends upon an operating state of the network determined by a controller 106. The operation of the controller 106 will be described in greater detail below.

A deframer 118 of the receiver 110 receives the full packet or compressed packet from the transmitting node through the communication channel. A decompressor 114 converts the full packet or compressed packet into the IP packet, and transfers the IP packet to a packet analyzer 112. The decompressor 114 stores a header of the IP packet in the memory 116. The stored header is used for decompressing a header of a subsequently received compressed packet. As shown in FIG. 3, the compressed header includes a context ID (CID). Thus, the decompressor 114 decompresses the compressed header on the basis of the context of the TCP/IP header specified by the CID.

Figure 5:
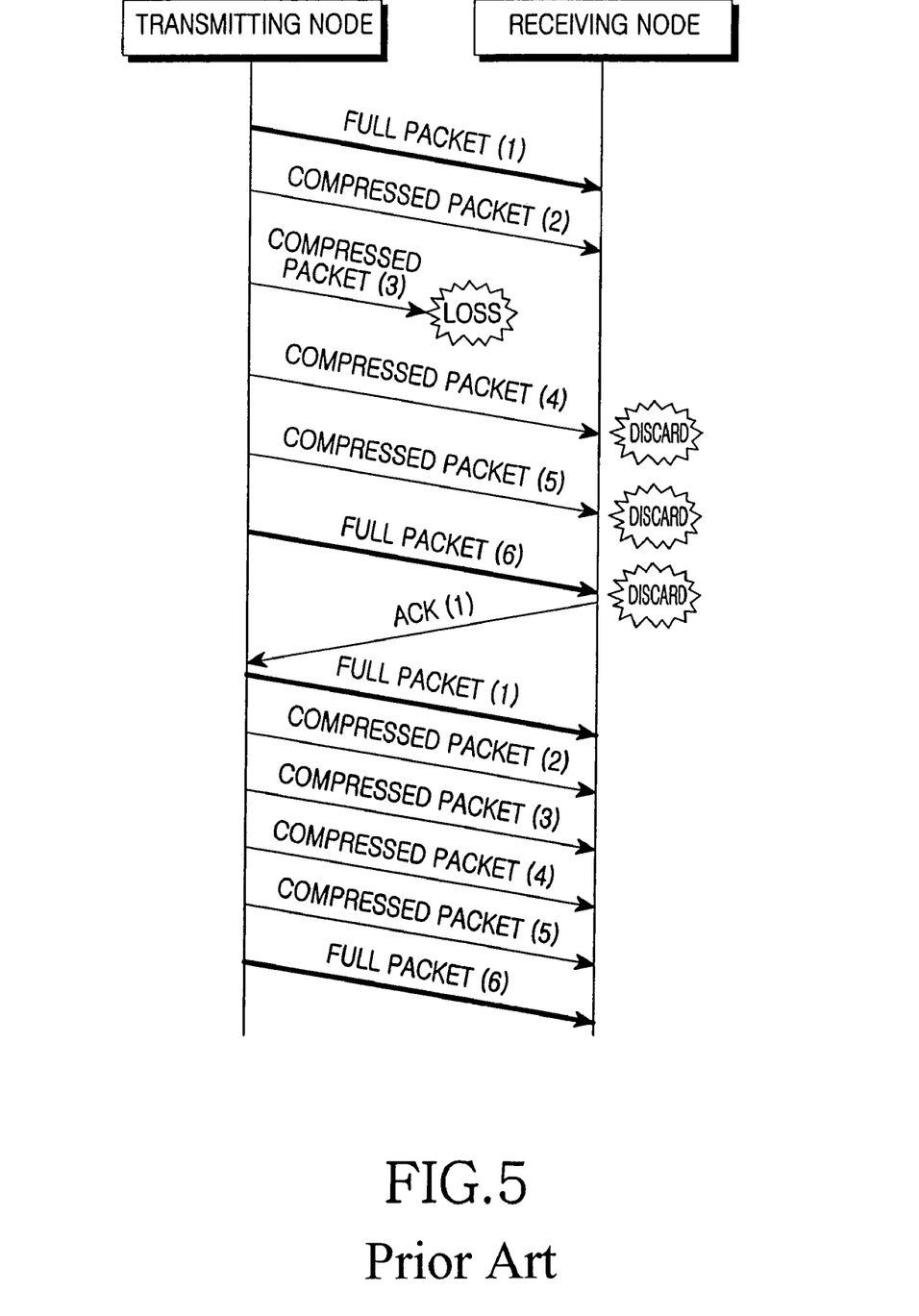
FIG. 5 is a view illustrating timings of transmitting packets.

FIG. 5 is a view illustrating timings of transmitting packets.

As shown in FIG. 5, if the packet generator of the transmitting node generates an IP packet (1), the compressor of the transmitting node stores a TCP/IP header of the IP packet (1) in an internal memory. At this time, the compressor sets a value for the CID in the IP packet, generates a full packet (1) and transmits the generated full packet (1) to the receiving node. The decompressor of the receiving node extracts the value of the CID from the full packet (1) and recovers the TCP/IP header. The packet analyzer of the receiving node analyzes the IP packet (1) containing the recovered TCP/IP header. At this time, the recovered header is stored in the internal memory of the receiving node.

The compressor of the transmitting node compresses a TCP/IP header of a subsequently generated IP packet (2) and then transmits a compressed packet having a compressed header to the receiving node. The compressed header within the compressed packet contains difference values between field values of the previous IP packet (1) and field values of the current IP packet (2). In the compressed packet, flags indicating whether corresponding fields are changed are set to "1s". The decompressor of the receiving node having received the IP packet (2) adds the field values contained in the TCP/IP header of the previous IP packet (1) to difference values contained in the delta fields of the compressed packet (2), thereby recovering field values of the IP packet (2) corresponding to the delta fields. Further, the packet analyzer of the receiving node analyzes the IP packet (2) having the TCP/IP header including the recovered field values corresponding to the delta fields, static fields extracted and stored from the IP packet (1), and a payload of the compressed packet (2). When the IP packet (2) is recovered, the TCP/IP header (or the TCP/IP header of the previous IP packet (1)) to be referred to is specified by the CID of the compressed packet (2). Further, the TCP/IP header of the IP packet (2) is stored in the internal memory.

Similarly, the compressor of the transmitting node converts a subsequently generated IP packet (3) into a compressed packet (3), and then transmits the compressed packet (3) to the receiving node. However, due to a network congested state, or for other reasons, the compressed packet (3) may be lost or damaged. Further, the receiving node can determine that the compressed packet (3) has been damaged on the basis of the result of a checksum analysis operation. In this case, the receiving node cannot recover field values corresponding to the delta fields of a compressed packet (4) subsequent to the compressed packet (3). Thus, the receiving node must discard received compressed packets (4, 5 and 6) until receiving a next full packet (6). Where the transmitting and receiving nodes are connected via a radio link, packets can be frequently lost. If the loss of packets occurs, the receiving node can frequently discard several packets. Thus, the data transmission rate is seriously degraded, particularly in wireless channels.

Upon receiving a duplicate ACK associated with a transmitted packet, the transmitting node retransmits the packet. Further, if the transmitting node does not receive an ACK within a predetermined time-out interval, the transmitting node retransmits a corresponding packet. Since the receiving node sends no ACK in response to the compressed packets, the receiving node must wait until the predetermined time-out interval expires so that the packet can be received. Furthermore, if the packet is lost, there is a problem in that the data transmission rate is seriously degraded since the transmitting node reduces the window size (or the number of packets capable of being simultaneously transmitted without an ACK).

To address the problem, RFC 2507 issued by IETF describes technologies for periodically transmitting full packets in a preset period. However, if a transmission period is too long in these technologies, the number of packets to be discarded increases. Further, if a transmission period is too short, there is another problem in that the efficiency of communication is degraded because of the transmission of a full packet having a large overhead.

Thus, the present invention proposes an algorithm of adaptively performing an operation according to the number of packet retransmissions. That is, where packet loss frequently occurs, better performance can be provided in the case where a header is uncompressed than in the case where a header is compressed. Thus, it is preferable that header compression is used where packet loss does not frequently occur, and that header compression is not used if packet loss frequently occurs.

In accordance with embodiments of the present invention, operating states of the network include congested, normal and unloaded states. Preferably, the operating state of the network can be determined on the basis of a packet retransmission ratio produced from the number of retransmitted packets generated by the transmitting node in a constant period for determining the operating state of the network. If the operating state of the network is decided on the basis of the packet retransmission ratio, a period for transmitting a full packet having an uncompressed header is decided according to the operating state of the network.

Figure 6:
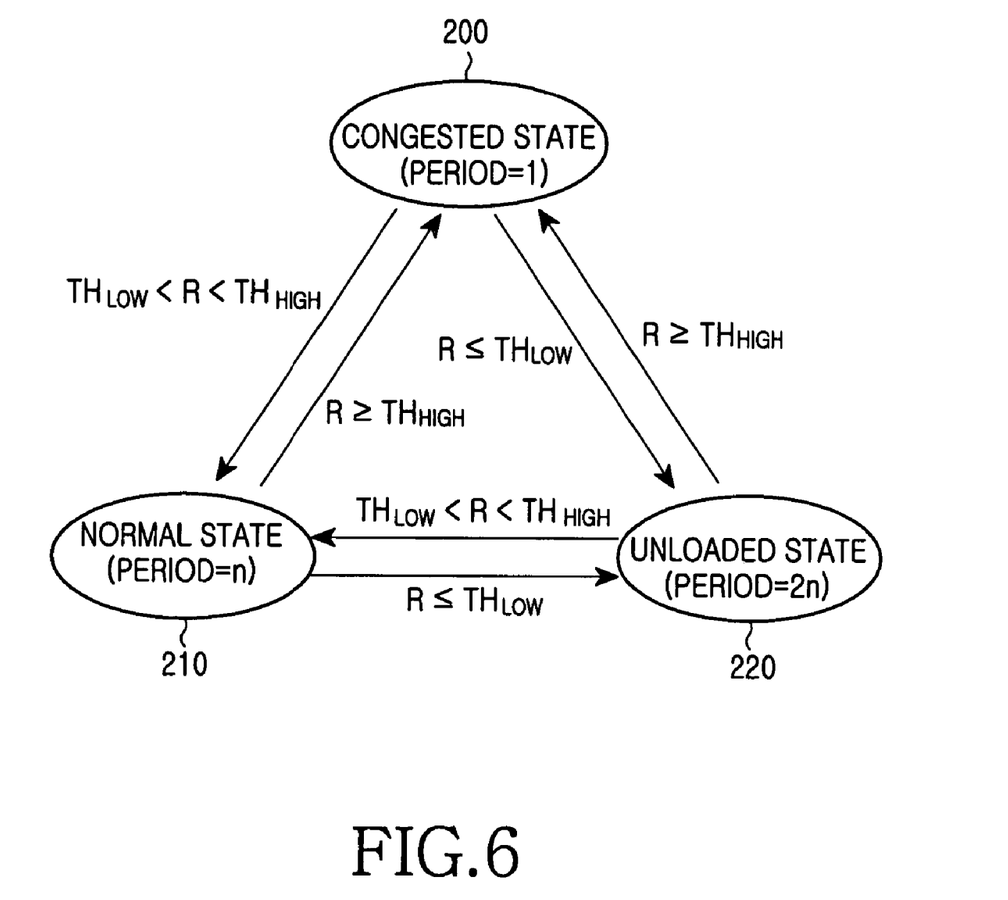
FIG. 6 is a state transition diagram illustrating three operating states of a network in accordance with an embodiment of the present invention.

FIG. 6 shows three operating states of the network. In FIG. 6, "R" denotes a packet retransmission ratio, and a period for transmitting a full packet is indicated by "1", "n" or "2n".

As shown in FIG. 6, if "R" is at or above a high-level threshold $TH_{HIGH}$, the operating state of the network is classified as a congested state 200. If "R" is at or below a low-level threshold $TH_{LOW}$, the operating state of the network is classified as an unloaded state 220. If "R" is a value between the low-level threshold $TH_{LOW}$ and high-level threshold $TH_{HIGH}$, the operating state of the network is classified as a normal state 210. For example, it is preferable that the high-level threshold is "0.10" and the low-level threshold is "0.05". If the network is in the congested state 200, the number of retransmitted packets can be reduced such that the full-packet transmission period is short. If the network is in the unloaded state 220, a high compression performance can be accomplished such that the full-packet transmission period is long. If the period is set to "n" in the normal state 210, the full-packet transmission period is set to "1" in the congested state 200 such that the full packet can be transmitted every time. Where the full-packet transmission period is set to "2n" in the unloaded state 220, the full packet can be transmitted every time "2n-1" number of compressed packets are transmitted.

Figure 7:
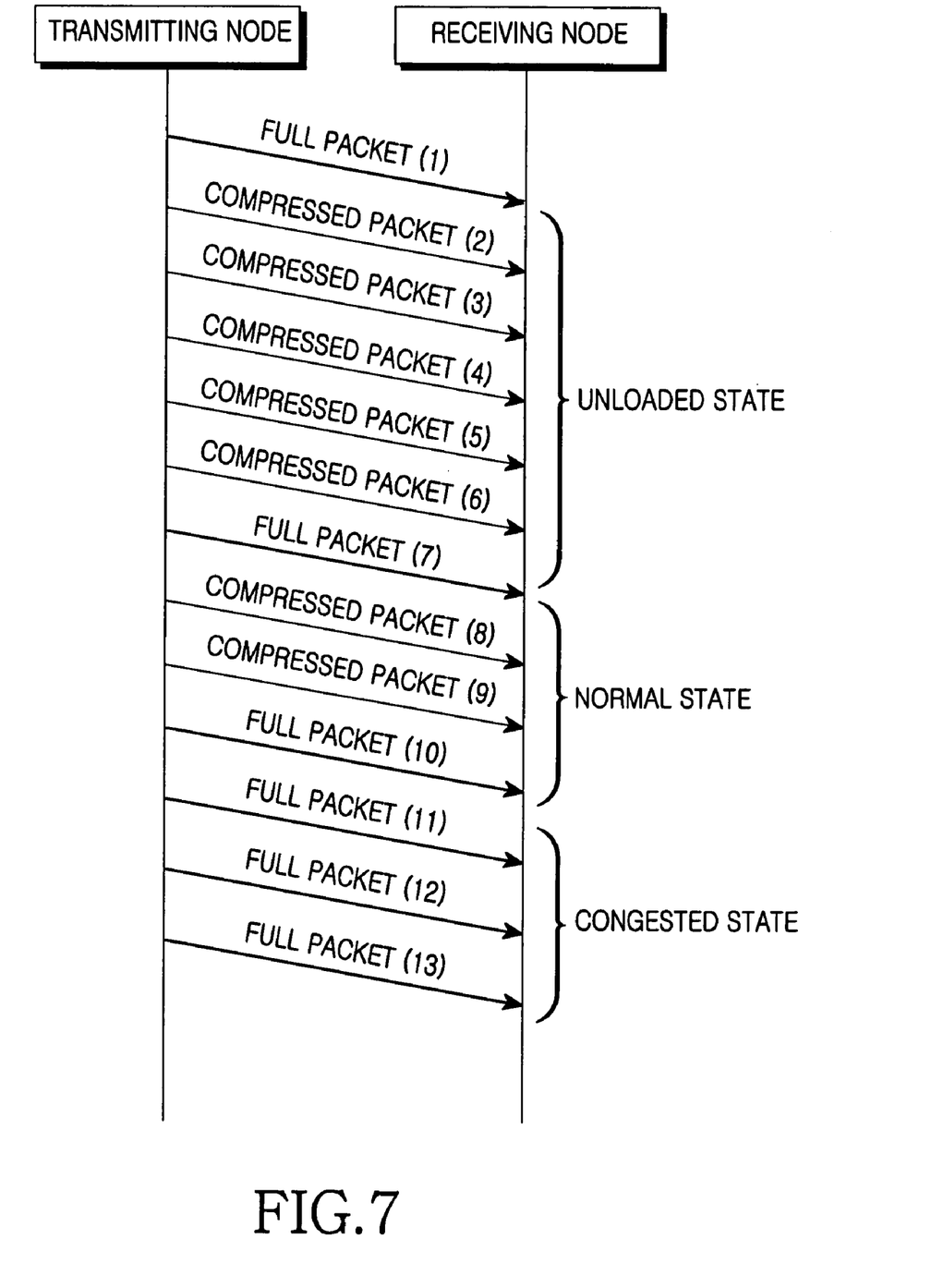
FIG. 7 is a view illustrating timings of transmitting packets using an adaptive period in accordance with an embodiment of the present invention.

FIG. 7 shows exemplary timings of transmitting full packets using adaptive periods in accordance with the present invention. In the following, it is assumed that the full-packet transmission period in the normal state is set to "3". That is, in the normal state, a full packet is transmitted every time two compressed packets are transmitted.

Referring to FIG. 7, a full packet (1) is transmitted in the unloaded state, and then another full packet (7) is transmitted after five compressed packets (2 to 6) have been transmitted. After two compressed packets (8 and 9) have been transmitted in the normal state, another full packet (10) is transmitted. In the congested state, no compressed packet is transmitted and only full packets (11, 12 and 13) are continuously transmitted.

Figure 8:
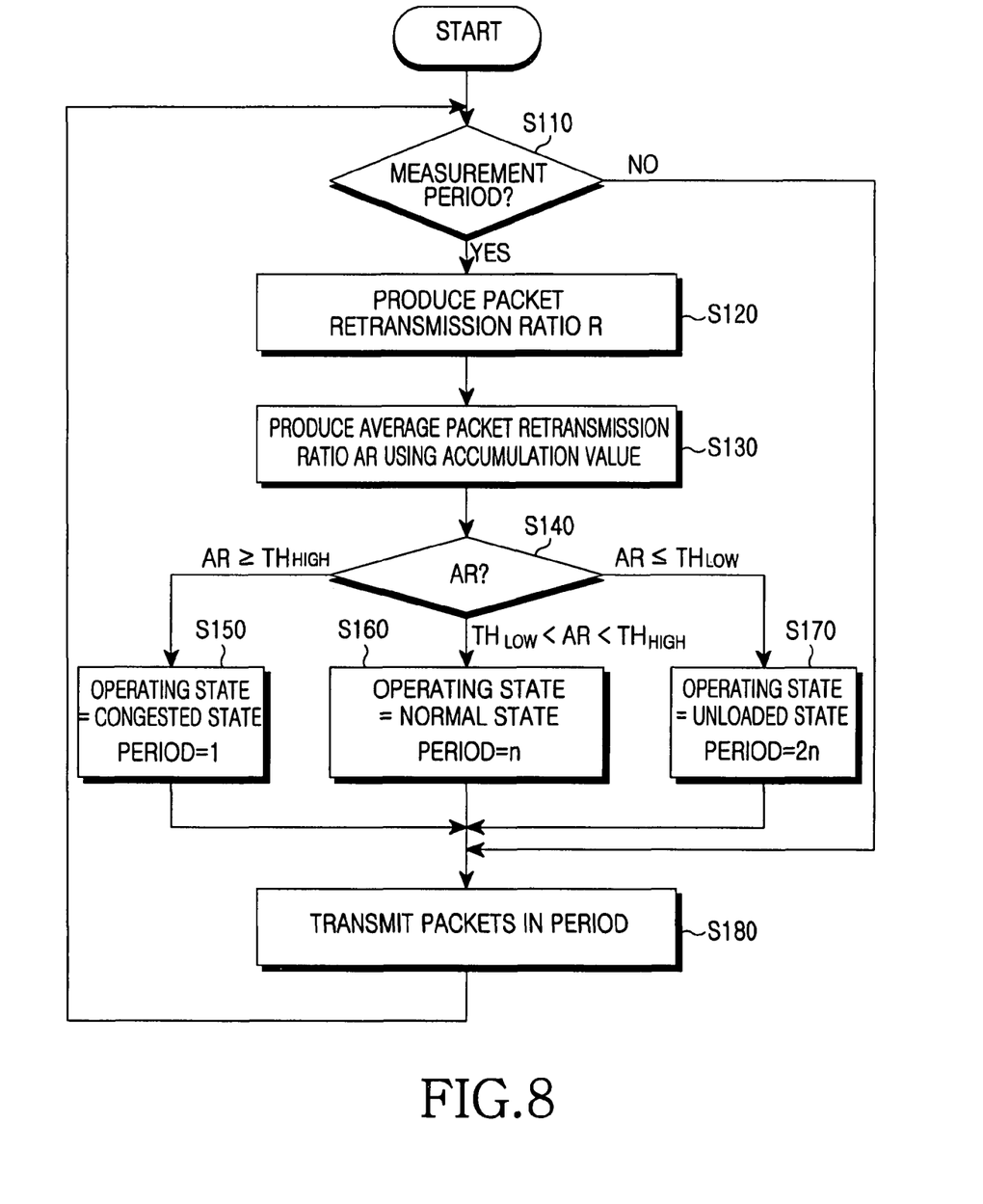
FIG. 8 is a flow chart illustrating a packet transmission operation in accordance with an embodiment of the present invention.
Figure 9:
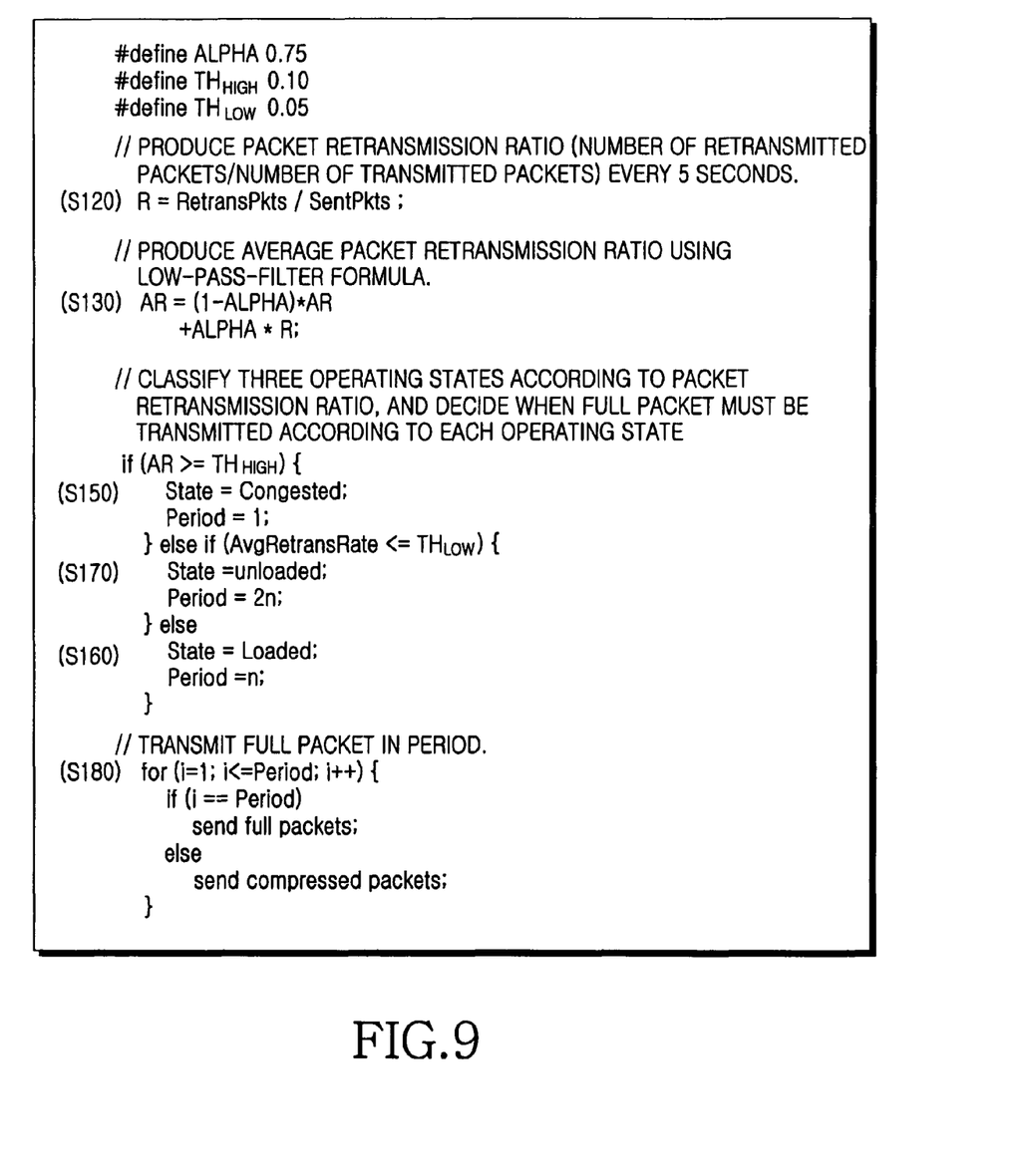
FIG. 9 is a view illustrating a C language-based algorithm associated with the packet transmission operation shown in FIG. 8 in accordance with an embodiment of the present invention.

FIG. 8 is a flow chart illustrating a packet transmission operation in accordance with an embodiment of the present invention; and FIG. 9 is a view illustrating a C language-based algorithm associated with the packet transmission operation shown in FIG. 8 in accordance with an embodiment of the present invention.

An operation in accordance with an embodiment of the present invention will be described in detail with reference to FIGS. 4 and 8.

At step S110, the controller of the transmitting node determines whether it is time for the operating state of the network to be determined. For example, a period for determining the operating state of the network is 5 seconds being a real-time transmission control protocol (RTCP)-based feedback period for transmitting state information in a real-time transmission protocol (RTP) defined in RFC 1889. If it is time for the operating state of the network to be determined, a packet retransmission ratio R is produced from the ratio of the number of retransmitted packets to the number of packets transmitted in the latest determination period at step S120. At step S130, the produced packet retransmission ratio and previously produced packet retransmission ratios are accumulated, and an average packet retransmission ratio AR is produced. The above step S130 will be described in detail.

Packet retransmission ratios produced in respective measurement times can be remarkably changed according to the operating state of the network. In order for an applicable average packet retransmission ratio AR to be produced so that an oscillation phenomenon can be avoided if possible, a low-pass-filtering formula is used. The average packet retransmission ratio is produced by the following Equation 1.

$$AR(i) = (1-\alpha)*AR(i-1) + \alpha*R \qquad \text{Equation 1}$$

In the above Equation 1, "R" denotes a packet retransmission ratio produced in a current measurement period, "AR" denotes an average packet retransmission ratio, and "i" denotes an index for identifying a measurement period. That is, "AR(i−1)" denotes an average packet retransmission ratio produced in a previous measurement period, and "AR(i)" denotes an average packet retransmission ratio produced in the current measurement period. Further, "α" denotes a weight value between "0" and "1". As the weight value becomes greater, the most recently produced packet retransmission ratio R has a greater effect on the average packet retransmission ratio. It is preferable that "α" is set to a value between 0.5 and 0.9. For example, "α" can be set to "0.75".

At step S140, the average packet retransmission ratio AR is compared with a predetermined high-level threshold $TH_{HIGH}$ and a predetermined low-level threshold $TH_{LOW}$. If AR. $TH_{HIGH}$ as a result of the comparison, step S150 is performed. On the other hand, if AR. $TH_{LOW}$, step S170 is performed. On the other hand, if $TH_{LOW}$. AR. $TH_{HIGH}$, step S160 is performed. For example, the high-level threshold is "0.10" and the low-level threshold is "0.05". Here, "0.10" means that the average packet retransmission ratio is 10 per cent, and "0.05" means that the average packet retransmission ratio is 5 percent.

At the above step S150, it is decided that the operating state of the network is the congested state, and the full-packet transmission period is "1". At the above step S160, it is decided that the operating state of the network is the normal state, and the full-packet transmission period is "n". At the above step S170, it is decided that the operating state of the network is the unloaded state, and the full-packet transmission period is "2n". Of course, the above-described period values can be changed by the quality and reliability of a network communication channel. For example, a value of the full-packet transmission period can be set to "2" or "3" in the congested state. Optionally, it will be understood that a value of the full-packet transmission period in the unloaded state can be set to more or less than "2n". The transmitting node's controller notifies the receiving node's compressor of the decided full-packet transmission period every measurement time.

At step S180, the transmitting node transmits packets on the basis of the decided full-packet transmission period. That is, since the packet is never lost if the network is in the unloaded state, the full packet is transmitted every (2n-1) compressed packets. Further, since the possibility of the packet loss is low if the network is in the normal state, the full packet is transmitted every (n-1) compressed packets. Furthermore, since the possibility of the packet loss is high if the network is in the congested state, the full packet is transmitted every time. At times other than periods of transmitting full packets, compressed packets are transmitted. Here, the method for generating the compressed packets is the same as the above description.

Embodiments of the present invention are associated with full-packet transmission technologies. The receiving node determines whether a received packet is a full packet or compressed packet, and then analyzes the received full packet or compressed packet. Since the determination and analysis operations of the receiving node are the same as the conventional determination and analysis operation, detailed descriptions for the determination and analysis operations are omitted.

Although the preferred embodiments of the present invention have been disclosed for illustrative purposes, those skilled in the art will appreciate that various modifications, additions and substitutions are possible, without departing from the scope of the invention. In accordance with embodiments of the present invention, a period for transmitting an uncompressed packet can be changed according to the quality of a communication path. Embodiments of the present invention are not limited by a method for configuring or compressing a packet, or a particular method for measuring the quality of the communication path. For example, the quality of the communication path can be measured using the quality (or signal-to-interference ratio, etc.) of a radio link being part of a path connected between nodes, a load ratio of a router, and so on. Embodiments of the present invention are applicable for all types of protocols for compressing a packet header and transmitting the compressed packet header. Embodiments of the present invention are not limited to the formats of packets shown in FIGS. 2 and 4. Rather, FIGS. 2 and 4 are merely exemplary.

Therefore, the present invention is not limited to the above-described embodiments, but the present invention is defined by the claims, which follow along with their full scope of equivalents.

As apparent from the above description, embodiments of the present invention can reduce the number of packets to be discarded due to a packet loss, prevent a compressed packet from being discarded without an additional acknowledgement in the reverse direction, improve the efficiency of transmission using header compression technologies without increasing the load of a system, and optimize the effect of the header compression technologies in part of a packet communication network configured by a radio link.

What is claimed is:

1. A method for transmitting packet data in a packet communication network, comprising the steps of:
    determining an operating state of the network and deciding a period for transmitting a full packet based on said operating state; and
    transmitting full packets having uncompressed headers at periodic transmission times according to the decided full-packet transmission period, and transmitting compressed packets having compressed headers during other transmission times;
    wherein if the operating state of the network is determined to be congested, the period for transmitting a full packet is set to be small, such that uncompressed headers are transmitted more often when the network is more congested.

2. The method as set forth in claim 1, wherein the step of deciding the transmission period comprises the steps of:
    producing a packet retransmission ratio as a ratio of the number of retransmitted packets to the number of packets transmitted in a latest period of measurement of the operating state of the network; and
    deciding the full-packet transmission period based on said packet retransmission ratio.

3. The method as set forth in claim 2, wherein a period for determining the operating state of the network is the same as a period for transmitting state information according to a real-time transmission protocol (RTP).

4. The method as set forth in claim 2, wherein the full-packet transmission period is decided as a first value if the packet retransmission ratio is at or above a predetermined high-level threshold;
    the full-packet transmission period is decided as a second value being greater than the first value if the packet retransmission ratio is at or below a predetermined low-level threshold; and
    the full-packet transmission period is decided as a third value between the first value and the second value if the packet retransmission ratio is between the low-level threshold and the high-level threshold.

5. The method as set forth in claim 4, wherein the first value is "1".

6. The method as set forth in claim 4, wherein the second value is twice the third value.

7. The method as set forth in claim 1, wherein the step of deciding the full-packet transmission period comprises the steps of:
    producing a packet retransmission ratio as a ratio of the number of retransmitted packets to the number of packets transmitted in a latest period of measurement of the operating state of the network;
    accumulating the produced packet retransmission ratio and other packet retransmission ratios produced during previous measurement times and producing an average packet retransmission ratio; and
    deciding the full-packet transmission period according to the produced average packet retransmission ratio.

8. The method as set forth in claim 7, wherein the average packet retransmission ratio is produced by:
    $AR(i)=(1-\alpha)*AR(i-1)+\alpha*R$, wherein "AR" denotes the average packet retransmission ratio, "i" denotes an index for identifying a period for determining the operating state of the network, "R" denotes a packet retransmission ratio, and "$\alpha$" denotes a weight value between "0" and "1".

9. The method as set forth in claim 7, wherein a period for determining the operating state of the network is the same as a period for transmitting state information according to a real-time transmission protocol (RTP).

10. The method as set forth in claim 7, wherein the full-packet transmission period is decided as a first value if the packet retransmission ratio is at or above a predetermined high-level threshold;
    the full-packet transmission period is decided as a second value being greater than the first value if the packet retransmission ratio is at or below a predetermined low-level threshold; and
    the full-packet transmission period is decided as a third value between the first value and the second value if the packet retransmission ratio is between the low-level threshold and the high-level threshold.

11. The method as set forth in claim 10, wherein the first value is "1".

12. The method as set forth in claim 10, wherein the second value is twice the third value.

13. An apparatus for transmitting packet data in a packet communication network, comprising:
    a controller for determining an operating state of the network and deciding a period for transmitting a full packet based on said operating state; and
    a transmitter for transmitting full packets having uncompressed headers at periodic transmission times based on the decided full-packet transmission period, and transmitting compressed packets having compressed headers during other transmission times;
    wherein controller sets the period for transmitting a full packet to be small if the operating state of the network is determined to be congested, such that uncompressed headers are transmitted more often when the network is more congested.

14. The apparatus as set forth in claim 13, wherein the controller produces a packet retransmission ratio as a ratio of the number of retransmitted packets to the number of packets transmitted in a latest period of measurement of the operating state of the network, and decides the full-packet transmission period based on said packet retransmission ratio.

15. The apparatus as set forth in claim 14, wherein the full-packet transmission period is decided as a first value if the packet retransmission ratio is at or above a predetermined high-level threshold;
    the full-packet transmission period is decided as a second value being greater than the first value if the packet retransmission ratio is at or below a predetermined low-level threshold; and
    the full-packet transmission period is decided as a third value between the first value and the second value if the packet retransmission ratio is between the low-level threshold and the high-level threshold.

16. The apparatus as set forth in claim 15, wherein the first value is "1".

17. The apparatus as set forth in claim 15, wherein the second value is twice the third value.

18. The apparatus as set forth in claim 13, wherein the controller produces a packet retransmission ratio as a ratio of the number of retransmitted packets to the number of packets transmitted in a latest period of measurement of the operating state of the network, accumulates the produced packet retransmission ratio and other packet retransmission ratios produced during previous measurement times, produces an average packet retransmission ratio, and decides the full-packet transmission period according to the produced average packet retransmission ratio.

19. The apparatus as set forth in claim 18, wherein the average packet retransmission ratio is produced by:

$AR(i)=(1-\alpha)*AR(i-1)+\alpha*R$, wherein "AR" denotes the average packet retransmission ratio, "i" denotes an index for identifying a period for determining the operating state of the network, "R" denotes a packet retransmission ratio, and "α" denotes a weight value between "0" and "1".

20. The apparatus as set forth in claim 18, wherein the full-packet transmission period is decided as a first value if the packet retransmission ratio is at or above a predetermined high-level threshold;

the full-packet transmission period is decided as a second value being greater than the first value if the packet retransmission ratio is at or below a predetermined low-level threshold; and the full-packet transmission period is decided as a third value between the first value and the second value if the packet retransmission ratio is between the low-level threshold and the high-level threshold.

21. The apparatus as set forth in claim 20, wherein the first value is "1".

22. The apparatus as set forth in claim 20, wherein the second value is twice the third value.

* * * * *